United States Patent [19]

O'Connor

[11] 4,424,333

[45] Jan. 3, 1984

[54] MODIFIED POLYURETHANE LIQUID POLYMER COMPOSITIONS

[75] Inventor: James M. O'Connor, Clinton; Donald L. Lickei, Wallingford; Micheal L. Rosin, Madison, all of Conn.

[73] Assignee: Olin Corporation, New Haven, Conn.

[21] Appl. No.: 306,845

[22] Filed: Sep. 29, 1981

Related U.S. Application Data

[63] Continuation-in-part of Ser. No. 203,212, Nov. 3, 1980, and Ser. No. 203,213, Nov. 3, 1980, abandoned.

[51] Int. Cl.$^3$ .................... C08G 18/10; C08G 18/67
[52] U.S. Cl. ......................... 528/75; 528/50; 528/52; 528/58; 528/78; 528/85
[58] Field of Search ............... 528/75, 50, 52, 73, 528/85, 58; 536/4.0, 120

[56] References Cited

U.S. PATENT DOCUMENTS

| | | | |
|---|---|---|---|
| 3,368,988 | 2/1968 | Sekmakes | 260/40 R |
| 4,062,826 | 12/1977 | Hutchinson et al. | 260/40 TN |
| 4,309,526 | 1/1982 | Baccei | 528/75 |

*Primary Examiner*—J. Ziegler
*Attorney, Agent, or Firm*—William D. Sabo

[57] ABSTRACT

A novel, heat curable, liquid polymer composition is disclosed which comprises a modified polyurethane oligomer containing terminal ethylenic unsaturation and a free radical generating catalyst. The composition has utility in preparing molded articles and coatings.

17 Claims, No Drawings

MODIFIED POLYURETHANE LIQUID POLYMER COMPOSITIONS

This application is a continuation-in-part of copending application Ser. No. 203,212, filed Nov. 3, 1980, and of copending application Ser. No. 203,213, abandoned, which was also filed Nov. 3, 1980.

This invention relates to a select liquid polymer composition containing a modified polyurethane oligomer having terminal ethylenic unsaturation, a process for preparing a polyurethane polymer product employing the select liquid polymer composition and a polyurethane polymer product prepared according to the process.

More particularly, it has now been discovered, according to the present invention, that a heat curable liquid polymer composition can be prepared comprising a modified polyurethane oligomer containing terminal ethylenic unsaturation and a free radical generating catalyst. Such a composition features the advantages of a one-component storage stable system that requires only heat for activation; the composition is useful in preparing a wide variety of castings, coatings and gel coats.

The polyurethane oligomer that is utilized according to the invention is prepared by reacting an organic polyisocyanate, a polyol and an isocyanate reactive group-containing unsaturated monomer. The reaction is carried out using methods well known in the art and employing such relative proportions of the reactants so as to achieve an oligomer product having an equivalent ratio of NCO to OH from about 0.8/1 to about 2/1, and preferably from about 1/1 to about 1.2/1. In forming the oligomer, there is also employed an equivalent ratio of isocyanate reactive group-containing unsaturated monomer to polyol in the range from about 0.6/1 to about 25/1, and preferably from about 0.8/1 to about 10/1. By reaction of the organic polyisocyanate, polyol and isocyanate reactive group-containing unsaturated monomer, a controlled molecular weight polyurethane oligomer with terminal reactive unsaturation is produced.

Preferably, the reaction is accelerated by employing a catalyst; common urethane catalysts, e.g., tertiary amines and metal compounds such as stannous octoate or dibutyltin dilaurate may be used. Any catalytic amount may be employed; illustratively, such amount varies, depending on the particular catalyst utilized, from about 0.01 to about 1 percent by weight of the polyurethane oligomer. It is also preferred to carry out the reaction in the presence of a reactive copolymerizable solvent. Suitable copolymerizable solvents include vinylidene compounds such as styrene, vinyl toluene, methacrylic esters, acrylic esters, divinyl benzene, and the like, familiar to those skilled in the art. The amount of copolymerizable solvent employed may be varied over a wide range. Generally, however, the copolymerizable solvent is employed in an amount of from about 0 to about 100 parts by weight per 100 parts by weight of the polyurethane oligomer of the present invention.

Any suitable organic polyisocyanate, or mixture of polyisocyanates, may be employed in preparing the polyurethane oligomer. Illustrative are toluene diisocyanate, such as the 80:20 and the 65:35 mixtures of the 2,4- and 2,6-isomers, ethylene diisocyanate, propylene diisocyanate, methylene-bis-(4-phenyl) isocyanate, xylene diisocyanate, 3,3'-bitoluene-4,4'-diisocyanate, hexamethylene diisocyanate, naphthalene-1,5-diisocyanate, the polymeric isocyanates such as polyphenylene polymethylene isocyanate, mixtures thereof, and the like. In accordance with a particularly preferred embodiment of the invention, there is employed an isomeric mixture of 2,4- and 2,6-toluene diisocyanate in which the weight ratio of the 2,4-isomer to the 2,6-isomer is from about 60:40 to about 90:10, and more preferably from about 65:35 to about 80:20.

The polyol reactant used in the polyurethane oligomer formation is selected from polyether polyols and mixtures of two or more such compounds. The polyol, or mixture of polyols, should have an average equivalent weight ranging from about 75 to about 500. Preferably, the average equivalent weight is about 100 to about 200. The average functionality of the polyol or polyol blend is at least about 3, preferably about 3 to about 8, and most preferably about 4 to about 6.

Suitable polyether polyols include various polyoxyalkylene polyols and mixtures thereof. These can be prepared, according to well-known methods, by condensing an alkylene oxide, or a mixture of alkylene oxides using random or step-wise addition, with a polyhydric initiator or a mixture of polyhydric initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiator used in preparing the polyether polyol reactant includes the following and mixtures thereof; (a) the aliphatic triols such as glycerol, trimethylolpropane, triethylolpropane, trimethylolhexane, and the like; (b) higher functionality hydroxy compounds such as sucrose, dextrose, sorbitol, pentaerythritol, methyl glucoside, and the like; (c) the polyamines such as tetraethylene diamine; and (d) the alkanolamines such as diethanolamine, triethanolamine, and the like.

A preferred group of polyhydric initiators for use in preparing the polyether polyol reactant is one which comprises mixtures of sucrose, dextrose or methyl glucoside with an aliphatic triol, preferably glycerol.

The alkylene oxide-polyhydric initiator condensation reaction is preferably carried out in the presence of a catalyst such as KOH as is well known in the art. In effecting the reaction, a sufficient proportion of alkylene oxide is used as to provide a final polyol product having an average equivalent weight of about 75 to about 500, preferably about 100 to about 200. The catalyst is thereafter preferably removed, leaving a polyether polyol which is ready for use in preparing the polyurethane oligomer of the invention.

Suitable isocyanate reactive group-containing unsaturated monomers include acrylates and acrylamides such as hydroxyethyl acrylate, hydroxypropyl acrylate, hydroxyethyl methacrylate, hydroxyethyl acrylamide, hydroxypropyl acrylamide, and the like, and mixtures thereof. Acrylates are preferred, with hydroxyethyl acrylate, hydroxypropyl acrylate, and hydroxyethyl methacrylate being the most preferred.

In forming the polyurethane oligomer, it is also preferred to include chain extenders, well known to those in the polyurethane art, in the reaction mixture. These chain extenders include low molecular weight glycols such as ethylene glycol, butane diol, hexane diol, propylene glycol, tripropylene glycol, bisphenol A, and the like. Other suitable chain extenders are polyether polyols, or mixtures of polyether polyols, having an average equivalent weight ranging from about 200 to about 4,000 and an average functionality of about 2. The amount of chain extender employed can vary broadly depending upon the amount of polyol reactant used in preparing the polyurethane oligomer.

The modified polyurethane oligomer liquid polymer system is polymerized and cured in the presence of a heat activated, free radical generating catalyst. The actual curing conditions may vary over wide ranges and are generally dependent on the nature and amount of the particular catalyst employed. Suitable free radical generating catalysts include peroxide or azo type compounds, known to those in the art. Typical peroxide catalysts are illustrated by organo peroxides and hydroperoxides such as benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate, and the like. Typical azo compounds are azobis-isobutyronitrile, 2-t-butylazo-2-cyano-4-methylpentane, and 4-t-butylazo-4-cyano-valeric acid. The preferred catalysts are peroxide catalysts. In particular, preferred peroxide catalysts are t-butyl peroctoate, t-butyl perbenzoate, and mixtures thereof. Any suitable catalytic amount may be employed; however, the catalyst generally is used in an amount from about 0.1 to about 10 parts by weight per 100 parts by weight of the polyurethane oligomer.

The composition of the present invention also may include other standard ingredients, if desired, such as internal mold release agents, e.g., calcium, zinc, magnesium, or sodium stearate. Pigments, dyes, stabilizers, viscosity modifiers (e.g., Group II metal oxides and hydroxides, such as magnesium oxide), thixotropes and various other additives familiar to those skilled in the art also may be added.

The polyurethane liquid polymer composition is generally stable over a reasonable period of time, and can be stored usually for at least about 2 to about 4 weeks prior to use. The composition can then be cured upon the application of heat to a polyurethane polymer product demonstrating properties particularly desirable for coating applications. The cured products exhibit hardness characteristics which are generally highly satisfactory, yet also have sufficient flexibility as to resist cracking.

The following examples are provided to further illustrate the invention. All parts are by weight unless otherwise specified.

Preparation of Polyurethane Oligomer

EXAMPLE 1

To 174 grams (2.0 eq.) of diisocyanate[1], 285 grams of styrene, 0.071 grams of hydroquinone and 0.142 grams of 2,6-di-tertiary-butyl-4-methylphenol (BHT) were added dropwise with stirring a mixture of 117.5 grams (0.8 eq.) of a polyether polyol[2], 19.2 grams (0.2 eq.) of a chain extender[3] and 116 grams (1.0 eq.) of unsaturated monomer[4] over a period of 2 hours. The reaction temperature rose from 21° to 36° C., and the mixture was stirred without heating for 2 hours after completion of the addition. At this point, 2.84 grams of catalyst[5] were added. After stirring without heating for 15 minutes, the reaction mixture was heated to 70° C. and was stirred at 70° C. for 4½ hours. The product had a viscosity of 5200 gps at 25 C.

[1]This is a mixture of toluene diisocyanate isomers (80:20 mixture of 2,4/2,6-isomers).
[2]This is a polyether polyol having a molecular weight of about 650 and an average functionality of about 4.25 and prepared by condensing a sucrose/glycerol mixture with propylene oxide to a final hydroxyl number of about 375.
[3]Tripropylene glycol.
[4]Hydroxyethyl acrylate.
[5]This is a 50% stannous octoate in dioctyl phthalate and is a commercial product of Witco Chemical Corporation purchased under the designation "T-10".

EXAMPLES 2–10

Additional polyurethane oligomers were prepared employing the same conditions as in Example 1, except that the time was varied for the reaction at 70° C. in the final step of the procedure. Different reactants and proportions of reactants were also used. Table I outlines the oligomer compositions prepared according to Examples 2–10.

TABLE I

| | | OLIGOMER COMPOSITIONS | | | | | | | | |
|---|---|---|---|---|---|---|---|---|---|---|
| | Diisocyanate[1] | Polyether Polyol (eq.) | | Chain Extender (eq.) | | Unsaturated Monomer (eq.) | | | Viscosity | Reaction Time |
| Example | (eq.) | A[2] | B[3] | C[4] | D[5] | E[6] | F[7] | G[8] | (cps at 25° C.) | at 70° C. (hrs.) |
| 1 | 2.0 | 0.8 | — | 0.2 | — | 1.0 | — | — | 5200 | 4½ |
| 2 | 2.0 | — | 0.6 | 0.4 | — | — | 1.0 | — | 4000 | 3½ |
| 3 | 2.0 | — | 0.2 | 0.6 | 0.2 | 0.5 | 0.5 | — | 640 | 4 |
| 4 | 2.0 | 0.2 | — | 0.8 | — | — | 1.0 | — | 650 | 10 |
| 5 | 2.0 | 0.6 | — | 0.2 | 0.2 | — | 1.0 | — | 3300 | 5 |
| 6 | 2.0 | 0.8 | — | 0.15 | 0.05 | 0.5 | 0.5 | — | 5350 | 7½ |
| 7 | 2.0 | 0.1 | 0.1 | — | 0.8 | — | 1.0 | — | 350 | 6½ |
| 8 | 2.0 | 0.8 | — | 0.2 | — | — | — | 1.0 | 355 | 5½ |
| 9 | 2.0 | 0.2 | — | 0.8 | — | — | — | 1.0 | 500 | 7 |
| 10 | 2.0 | — | 0.2 | 0.8 | — | 1.0 | — | — | — | 3½ |

[1]The diisocyanate is a mixture of toluene diisocyanate isomers (80:20 mixture of 2,4/2,6-isomers).
[2]A polyether polyol having a molecular weight of about 650 and an average functionality of about 4.25 and prepared by condensing a sucrose/glycerol mixture with propylene oxide to a final hydroxyl number of about 375.
[3]A polyether polyol having a molecular weight of about 480 and an average functionality of about 4.54 and prepared by condensing a sucrose/glycerol mixture with propylene oxide to a final hydroxyl number of about 530.
[4]Tripropylene glycol.
[5]A polyether polyol having a molecular weight of about 425 and prepared by condensing propylene glycol with propylene oxide to a final hydroxyl number of about 265.
[6]Hydroxyethyl acrylate.
[7]Hydroxypropyl acrylate.
[8]Hydroxyethyl methacrylate.

Preparation of Polyurethane Moldings

EXAMPLES 11–19

Test panels were prepared containing polyurethane oligomers prepared according to Examples 1–9. The following procedure was followed in the preparation of the cured panels.

(a) The polyurethane oligomer was mixed with a free radical generating catalyst[1], and the resulting mixture was degassed by placement in a vacuum dessicator at about 1-10 torr pressure for approximately 1-2 minutes or until initial foaming subsided.

(b) The degassed mixture was poured into a mold formed by glass plates coated with a liquid mold release agent, such as "MR515" commercially available from Greenchem Products, Inc., and held apart by one-sixteenth inch spacers.

(c) The mold was then placed in an oven at 120° C. for 1 hour.

The physical properties of panels prepared in this manner are included in Table II below. The physical properties were determined in accordance with standard test procedures: Flexural modulus and flexural strength-ASTM D790; tensile strength and elongation-ASTM D3574; and izod-ASTM D256. The barcol hardness was determined by using a Colman Model GYZJ 934-1 Impressor.

[1]The panels were prepared using 0.5% tertiary butyl peroctoate (commercially available from Lupersol Co. under the designation "PDO", understood to consist of 50% tertiary butyl peroctoate and 50% dioctyl phthalate) and 0.5% tertiary butyl perbenzoate as initiator.

COMPARATIVE EXAMPLE 1

For purposes of comparison, a test panel containing a polyester resin was prepared following the procedure of Examples 11-19. In forming the panel, in place of a polyurethane oligomer of Examples 1-9, there was employed a vinyl ester resin commercially available from Dow Chemical Company under the designation "Derakane 470".

The physical properties of the panel prepared in this manner are included in Table II below. The physical properties were determined in accordance with standard test procedures: Flexural modulus and flexural strength-ASTM D790; tensile strength and elongation-ASTM D3574; and izod-ASTM D256. The Barcol hardness was determined by using a Colman Model GYZJ 934-1 Impressor.

In comparing the results, the panels prepared from polyurethane oligomers of the invention showed overall properties at least comparable to, or better than, those demonstrated by the panel made from the vinyl ester. In particular, these panels exhibited improved elongation values, indicating desirable flexibility and toughness characteristics. These properties are important in coating applications where crack resistance is generally sought.

What is claimed is:

1. A polyurethane liquid polymer composition comprising a polyurethane oligomer and a heat activated free radical generating catalyst, said polyurethane oligomer having an equivalent ratio of NCO to OH from about 0.8/1 to about 2/1 and being prepared by reacting
   (a) an organic polyisocyanate;
   (b) a polyol having an average equivalent weight of about 75 to about 500 and an average functionality of at least about 3; and
   (c) an isocyanate reactive group-containing unsaturated monomer selected from the group consisting of
      hydroxyethyl acrylate, hydroxypropyl acrylate, hydroxyethyl methacrylate, hydroxyethyl acrylamide, hydroxypropyl acrylamide, and mixtures thereof; and
   wherein there is employed an equivalent ratio of said isocyanate reactive group-containing unsaturated monomer to said polyol in the range from about 0.6/1 to about 25/1.

2. The composition of claim 1, including a copolymerizable solvent in said polyurethane liquid polymer composition.

3. The composition of claim 2, wherein said copolymerizable solvent is styrene.

4. The composition of claim 1, wherein said polyurethane oligomer has an equivalent ratio of NCO to OH from about 1/1 to about 1.2/1.

5. The composition of claim 4, wherein said equivalent ratio of said isocyanate reactive group-containing unsaturated monomer to said polyol is in the range from about 0.8/1 to about 10/1.

6. The composition of claim 1, wherein said unsaturated monomer is selected from the group consisting of hydroxyethyl acrylate, hydroxypropyl acrylate, hydroxyethyl methacrylate, and mixtures thereof.

7. The composition of claim 1, wherein said heat activated free radical generating catalyst is a peroxide catalyst.

8. The composition of claim 7, wherein said peroxide catalyst is selected from the group consisting of t-butyl perbenzoate, t-butyl peroctoate, and mixtures thereof.

9. The composition of claim 1, wherein said polyol has an average equivalent weight of about 100 to about 200 and an average functionality of about 4 to about 6 and is prepared by condensing an alkylene oxide selected from the group consisting of propylene oxide and mixtures of propylene oxide and ethylene oxide with a polyhydric initiator selected from the group consisting of a mixture of sucrose and an aliphatic triol, a mixture

TABLE II

PHYSICAL PROPERTIES OF POLYURETHANE OLIGOMER CASTINGS

| Example | Oligomer | Tensile Strength (psi) | Elongation (%) | Flexural Strength (psi) | Flexural Modulus $\times 10^6$ (psi) | Izod (ft.-lb./in.) Notched | Izod (ft.-lb./in.) Unnotched | Barcol Hardness |
|---|---|---|---|---|---|---|---|---|
| 11 | Example 1 | 9770 | 4.39 | 17750 | 0.544 | 2.29 | 4.45 | 38 |
| 12 | Example 2 | 7000 | 2.92 | 15760 | 0.567 | 2.80 | 4.46 | 42 |
| 13 | Example 3 | 9620 | 4.04 | 18300 | 0.541 | 3.90 | 5.41 | 39 |
| 14 | Example 4 | 10300 | 4.65 | 18600 | 0.544 | 2.23 | 4.97 | 41 |
| 15 | Example 5 | 10200 | 4.58 | 17300 | 0.505 | 2.37 | 4.44 | 34 |
| 16 | Example 6 | 10000 | 4.39 | 17600 | 0.521 | 3.04 | 5.01 | 40 |
| 17 | Example 7 | 9500 | 4.35 | 14500 | 0.466 | 2.32 | 5.96 | 25 |
| 18 | Example 8 | 11680 | 5.29 | 18000 | 0.518 | 2.28 | 4.36 | 38 |
| 19 | Example 9 | 10500 | 4.61 | 19800 | 0.572 | 2.25 | 5.42 | 43 |
| CE-1 | — | 6680 | 3.02 | 16600 | 0.585 | 2.75 | 3.68 | 46 | of dextrose and an aliphatic triol, and a mixture of a methyl glucoside with an aliphatic triol.

10. The composition of claim 1, wherein said polyurethane oligomer further comprises a chain extending agent.

11. The composition of claim 10, wherein said chain extending agent is selected from the group consisting of tripropylene glycol, a polyol having an average equivalent weight ranging from about 200 to about 4,000 and an average functionality of about 2, and mixtures thereof.

12. The composition of claim 1, wherein said polyurethane oligomer is prepared by employing toluene diisocyanate as said organic polyisocyanate.

13. The composition of claim 1, wherein said heat activated free radical generating catalyst is a peroxide catalyst, and further wherein said polyurethane oligomer has an equivalent ratio of NCO to OH from about 1/1 to about 1.2/1 and is prepared by reacting (a) toluene diisocyanate;
(b) a polyether polyol having an average equivalent weight of about 100 to about 200 and an average functionality of about 4 to about 6 and prepared by condensing an alkylene oxide selected from the group consisting of propylene oxide and mixtures of propylene oxide and ethylene oxide with polyhydric initiator selected from the group consisting of a mixture of sucrose and an aliphatic triol, a mixture of dextrose and an aliphatic triol, and a mixture of a methyl glucoside with an aliphatic triol; and (c) an isocyanate reactive group-containing unsaturated monomer selected from the group consisting of hydroxyethyl acrylate, hydroxypropyl acrylate, hydroxyethyl methacrylate, and mixtures thereof; and wherein said equivalent ratio of said isocyanate reactive group-containing unsaturated monomer to said polyol is in the range from about 0.8/1 to about 10/1.

14. The composition of claim 13, including a copolymerizable solvent in said polyurethane liquid polymer composition.

15. The composition of claim 14, wherein said copolymerizable solvent is styrene.

16. The composition of claim 15, wherein said polyurethane oligomer further comprises a chain extending agent.

17. The composition of claim 16, wherein said chain extending agent is selected from the group consisting of tripropylene glycol, a polyol having an average equivalent weight ranging from about 200 to about 4,000 and an average functionality of about 2, and mixtures thereof.

* * * * *